(12) United States Patent
Harrity et al.

(10) Patent No.: US 7,726,860 B2
(45) Date of Patent: Jun. 1, 2010

(54) LIGHT APPARATUS

(75) Inventors: Kevin Harrity, Oak Creek, WI (US);
Cory J. Nelson, Racine, WI (US); David R. Carlson, Cedarburg, WI (US); Mark E. Johnson, Mount Prospect, IL (US);
Scott W. Demarest, Caledonia, WI (US);
Matthew B. Dubin, Tucson, AZ (US);
Kenneth W. Michaels, Spring Grove, IL (US)

(73) Assignee: S.C. Johnson & Son, Inc., Racine, WI (US)

( * ) Notice: Subject to any disclaimer, the term of this patent is extended or adjusted under 35 U.S.C. 154(b) by 703 days.

(21) Appl. No.: 11/542,370

(22) Filed: Oct. 3, 2006

(65) Prior Publication Data

US 2007/0091633 A1 Apr. 26, 2007

Related U.S. Application Data

(63) Continuation-in-part of application No. 11/485,071, filed on Jul. 12, 2006, and a continuation-in-part of application No. 11/265,738, filed on Nov. 2, 2005.

(60) Provisional application No. 60/723,166, filed on Oct. 3, 2005.

(51) Int. Cl.
*F21V 8/00* (2006.01)
(52) U.S. Cl. ............... 362/555; 362/560; 362/558; 362/800; 362/569
(58) Field of Classification Search ................. 362/555, 362/560, 558, 569, 800
See application file for complete search history.

(56) References Cited

U.S. PATENT DOCUMENTS 240,764 A 4/1881 Reynolds
(Continued)

FOREIGN PATENT DOCUMENTS

EP 0805304 A2 11/1997
(Continued)

OTHER PUBLICATIONS

International Search Report in PCT/US2006/038610 dated Mar. 8, 2007.
(Continued)

*Primary Examiner*—Laura Tso

(57) ABSTRACT

A light apparatus includes one or more light pipes and/or diffusers to transfer and/or diffuse light from a few point light sources to a broader area and to other points. A hollow light pipe includes a light transmissive sidewall that encompasses an interior space, which receives and hides control circuitry for the light sources therein. A bottom end surface of the hollow light pipe is disposed adjacent to one or more light sources and transmits the light therefrom over a relatively large, uniform area. A solid core light pipe has a light receiving end and a light dispersion end having a reflective facet therein. The reflective facet includes a depression forming a reflective surface angularly displaced from a longitudinal axis of the solid core light pipe. A light diffuser surrounding a point source of light is adapted to cause the point source to look like a flame. A light apparatus including the hollow light pipe and the solid core light pipe and/or the light diffuser is adapted to provide a plurality of different light effects, including a multi-color light show through the hollow light pipe and a flame flicker effect through the solid core light pipe.

23 Claims, 12 Drawing Sheets

U.S. PATENT DOCUMENTS

| | | |
|---|---|---|
| 606,850 A | 7/1898 | Wallace et al. |
| 738,999 A | 9/1903 | Higgins |
| D75,124 S | 5/1928 | Jenkins |
| 1,806,046 A | 5/1931 | Deeter |
| 1,975,496 A | 10/1934 | Barrett, Jr. |
| 2,080,259 A | 5/1937 | Frei, Jr. |
| RE20,434 E | 7/1937 | Barrett, Jr. |
| 2,102,224 A | 12/1937 | Ruppel |
| 2,124,009 A | 7/1938 | Schneider |
| 2,254,134 A | 8/1941 | Berry |
| 2,437,809 A | 3/1948 | Engelbrecht |
| 2,459,898 A | 1/1949 | Stiffel |
| 2,523,818 A | 9/1950 | Cortes |
| 2,567,780 A | 9/1951 | Oppelt |
| 2,608,645 A | 8/1952 | Hines |
| 2,632,098 A | 3/1953 | Marchese |
| 2,721,244 A | 10/1955 | Seekins |
| 2,807,691 A | 9/1957 | Sorenson |
| 2,863,547 A | 12/1958 | Cavalleri |
| 2,935,608 A | 5/1960 | Mirzwinski |
| D191,396 S | 9/1961 | Weber, III |
| 3,145,323 A | 8/1964 | Klotz |
| 3,183,295 A | 5/1965 | Myles |
| 3,233,093 A | 2/1966 | Gerlat |
| 3,435,286 A | 3/1969 | Kayatt |
| 3,473,014 A | 10/1969 | Kayne |
| 3,500,126 A | 3/1970 | Ford |
| 3,506,876 A | 4/1970 | Antonich |
| 3,531,637 A | 9/1970 | Nathanson |
| 3,604,920 A | 9/1971 | Niles |
| 3,644,775 A | 2/1972 | Damoth et al. |
| 3,710,182 A | 1/1973 | Van Reenen |
| 3,772,506 A | 11/1973 | Junginger |
| 3,789,211 A | 1/1974 | Kramer |
| 3,860,847 A | 1/1975 | Carley |
| 3,890,085 A | 6/1975 | Andeweg |
| 3,893,041 A | 7/1975 | Foster et al. |
| 3,934,105 A | 1/1976 | Lockard |
| 3,943,352 A | 3/1976 | Pena May |
| 3,944,806 A | 3/1976 | Jones et al. |
| 3,948,445 A | 4/1976 | Andeweg |
| 4,017,729 A | 4/1977 | Frazier, Jr. |
| 4,052,622 A | 10/1977 | Lorenz |
| 4,064,414 A | 12/1977 | Bergeson et al. |
| 4,071,805 A | 1/1978 | Brock |
| 4,159,442 A | 6/1979 | Komatsu |
| 4,177,407 A | 12/1979 | Goldstein et al. |
| 4,187,532 A | 2/1980 | Naffier |
| 4,228,885 A | 10/1980 | Cavalleri |
| 4,253,045 A | 2/1981 | Weber |
| 4,283,661 A | 8/1981 | Doty |
| 4,307,460 A | 12/1981 | Polonsky |
| 4,325,110 A | 4/1982 | Tang |
| 4,328,534 A | 5/1982 | Abe |
| 4,346,059 A | 8/1982 | Spector |
| 4,417,182 A | 11/1983 | Weber |
| 4,477,249 A | 10/1984 | Ruzek et al. |
| 4,492,896 A | 1/1985 | Jullien |
| 4,500,795 A | 2/1985 | Hochstein et al. |
| 4,508,520 A | 4/1985 | Sellers et al. |
| 4,510,556 A | 4/1985 | Johnson |
| 4,540,984 A | 9/1985 | Waldman |
| 4,550,363 A | 10/1985 | Sandell |
| 4,568,269 A | 2/1986 | Lin |
| 4,593,232 A | 7/1986 | McEdwards |
| 4,617,614 A | 10/1986 | Lederer |
| D287,885 S | 1/1987 | Bolduc |
| D288,856 S | 3/1987 | Owen et al. |
| 4,675,578 A | 6/1987 | Mitchell et al. |
| 4,693,681 A | 9/1987 | Comstock |
| 4,695,439 A | 9/1987 | Spector |
| 4,714,984 A | 12/1987 | Spector |
| 4,768,393 A | 9/1988 | Beaman |
| 4,804,323 A | 2/1989 | Kim |
| 4,839,780 A | 6/1989 | Chuan et al. |
| 4,866,580 A | 9/1989 | Blackerby |
| 4,870,325 A | 9/1989 | Kazar |
| 4,878,157 A | 10/1989 | Koch |
| 4,895,512 A | 1/1990 | Sullivan et al. |
| 4,901,891 A | 2/1990 | Goncalves |
| 4,926,298 A | 5/1990 | Zimmerman |
| 4,933,815 A | 6/1990 | Parthasarathy |
| 4,983,119 A | 1/1991 | Lin |
| 5,013,972 A | 5/1991 | Malkieli et al. |
| 5,015,175 A | 5/1991 | Lee |
| 5,032,766 A | 7/1991 | Gundlach et al. |
| 5,034,658 A | 7/1991 | Hiering et al. |
| 5,057,003 A | 10/1991 | Yang |
| 5,060,119 A | 10/1991 | Parthasarathy |
| 5,091,678 A | 2/1992 | Chin-Song |
| 5,097,180 A | 3/1992 | Ignon et al. |
| 5,138,538 A | 8/1992 | Sperling |
| 5,152,602 A | 10/1992 | Boschetto |
| 5,164,636 A | 11/1992 | Allaire |
| 5,174,645 A | 12/1992 | Chung |
| 5,178,450 A | 1/1993 | Zelensky et al. |
| 5,212,672 A | 5/1993 | Loisch et al. |
| 5,217,696 A | 6/1993 | Wolverton et al. |
| 5,228,771 A | 7/1993 | Zimmerman |
| D347,906 S | 6/1994 | Dorick |
| 5,370,313 A | 12/1994 | Beard |
| 5,392,379 A | 2/1995 | Fussel |
| D357,085 S | 4/1995 | Ratia |
| 5,519,593 A | 5/1996 | Hasness |
| 5,564,665 A | 10/1996 | Resnick |
| 5,600,209 A | 2/1997 | St. Louis |
| D387,447 S | 12/1997 | Hollington |
| 5,697,695 A | 12/1997 | Lin et al. |
| D388,892 S | 1/1998 | Ratia |
| 5,754,124 A | 5/1998 | Daggett et al. |
| 5,782,553 A | 7/1998 | McDermott |
| 5,791,774 A | 8/1998 | Briles |
| 5,820,251 A | 10/1998 | Greenberg et al. |
| 5,847,512 A | 12/1998 | Baba et al. |
| 5,863,108 A | 1/1999 | Lederer |
| D406,365 S | 3/1999 | Furner |
| 5,894,201 A | 4/1999 | Wong |
| 5,909,954 A | 6/1999 | Thomas |
| 5,924,784 A | 7/1999 | Chliwnyj et al. |
| 5,964,519 A | 10/1999 | Chun-Ying |
| 5,969,479 A | 10/1999 | Wong |
| 5,980,064 A | 11/1999 | Metroyanis |
| 6,016,038 A | 1/2000 | Mueller et al. |
| 6,017,139 A | 1/2000 | Lederer |
| D420,754 S | 2/2000 | Huang |
| 6,031,958 A | 2/2000 | McGaffigan |
| D422,101 S | 3/2000 | Barraclough et al. |
| 6,066,924 A | 5/2000 | Lederer |
| D426,667 S | 6/2000 | Kaviani |
| 6,106,786 A | 8/2000 | Akahoshi |
| 6,140,867 A | 8/2000 | Stathakis et al. |
| 6,135,612 A | 10/2000 | Clore |
| 6,152,568 A | 11/2000 | Baba et al. |
| 6,153,981 A | 11/2000 | Thomas et al. |
| D437,040 S | 1/2001 | Soller et al. |
| D437,064 S | 1/2001 | Boss |
| 6,196,706 B1 | 3/2001 | Cutts |
| RE37,168 E | 5/2001 | St. Louis |
| 6,241,362 B1 | 6/2001 | Morrison |
| 6,288,498 B1 | 9/2001 | Cheng |
| 6,302,559 B1 | 10/2001 | Warren |
| 6,305,820 B1 | 10/2001 | Poon |
| D451,183 S | 11/2001 | Hirano et al. |
| 6,351,079 B1 | 2/2002 | Willis |

| | | |
|---|---|---|
| 6,361,192 B1 | 3/2002 | Fussell et al. |
| 6,394,630 B1 | 5/2002 | Skidmore et al. |
| D460,894 S | 7/2002 | Ziegenfus et al. |
| 6,443,594 B1 | 9/2002 | Marshall et al. |
| 6,454,425 B1 | 9/2002 | Lin |
| 6,471,370 B2 | 10/2002 | Schleifer |
| 6,481,882 B1 | 11/2002 | Pojar |
| 6,486,726 B1 | 11/2002 | Worley, Sr. et al. |
| 6,525,487 B2 | 2/2003 | Wei |
| 6,527,411 B1 | 3/2003 | Sayers |
| 6,533,828 B1 | 3/2003 | Calzada |
| 6,556,147 B1 | 4/2003 | Fisher et al. |
| D474,854 S | 5/2003 | Lam |
| 6,595,676 B2 | 7/2003 | Starry |
| 6,616,308 B2 | 9/2003 | Jensen et al. |
| D482,465 S | 11/2003 | Slomowitz |
| 6,646,491 B2 | 11/2003 | Worley, Sr. et al. |
| 6,672,742 B2 | 1/2004 | Alley |
| 6,685,335 B1 | 2/2004 | Yeh et al. |
| 6,685,345 B1 | 2/2004 | Velasquez |
| 6,688,752 B2 | 2/2004 | Moore |
| 6,706,988 B1 | 3/2004 | Helf et al. |
| 6,712,493 B2 | 3/2004 | Tell et al. |
| 6,712,494 B1 | 3/2004 | Hodge |
| D488,582 S | 4/2004 | Connelly et al. |
| 6,719,443 B2 | 4/2004 | Gutstein et al. |
| 6,726,350 B1 | 4/2004 | Herold |
| 6,729,748 B2 | 5/2004 | Reilly |
| 6,741,042 B1 | 5/2004 | Tang |
| D492,443 S | 6/2004 | Smith et al. |
| D495,087 S | 8/2004 | Brown et al. |
| 6,779,905 B1 | 8/2004 | Mazursky et al. |
| D495,819 S | 9/2004 | Krieger et al. |
| 6,801,003 B2 | 10/2004 | Schanberger et al. |
| 6,806,659 B1 | 10/2004 | Mueller et al. |
| 6,808,297 B2 | 10/2004 | Jensen et al. |
| 6,854,208 B1 | 2/2005 | Chuang et al. |
| 6,857,765 B2 | 2/2005 | Kameda et al. |
| 6,880,958 B2 | 4/2005 | Swarovski |
| 6,906,472 B2 | 6/2005 | Wong |
| 6,926,423 B2 | 8/2005 | Bucher et al. |
| 6,932,496 B2 | 8/2005 | Rizkin et al. |
| 6,950,607 B2 | 9/2005 | Yip et al. |
| 6,963,180 B2 | 11/2005 | Rose |
| 6,965,205 B2 | 11/2005 | Piepgras et al. |
| 6,966,665 B2 | 11/2005 | Limburg et al. |
| 7,004,598 B2 | 2/2006 | Wong |
| 7,011,426 B2 | 3/2006 | Gabor |
| 7,029,146 B2 | 4/2006 | Kitchen |
| 7,061,394 B2 | 6/2006 | Biebl |
| 7,064,498 B2 | 6/2006 | Dowling |
| 7,093,949 B2 | 8/2006 | Hart et al. |
| 7,098,600 B2 | 8/2006 | Li et al. |
| 2002/0080601 A1 | 6/2002 | Meltzer |
| 2002/0093834 A1 | 7/2002 | Yu et al. |
| 2002/0176260 A1 | 11/2002 | Liao |
| 2003/0012016 A1 | 1/2003 | Lee |
| 2003/0053305 A1 | 3/2003 | Lin |
| 2003/0137258 A1 | 7/2003 | Piepgras et al. |
| 2003/0174500 A1 | 9/2003 | Kameda et al. |
| 2003/0189825 A1 | 10/2003 | Tauch et al. |
| 2003/0210555 A1 | 11/2003 | Cicero et al. |
| 2003/0214259 A9 | 11/2003 | Dowling et al. |
| 2004/0032733 A1 | 2/2004 | Gabriel et al. |
| 2004/0037069 A1 | 2/2004 | Blackbourn |
| 2004/0066658 A1 | 4/2004 | Leung et al. |
| 2004/0141315 A1 | 7/2004 | Sherburne |
| 2004/0196658 A1 | 10/2004 | Fung |
| 2004/0223326 A1 | 11/2004 | Wainwright |
| 2004/0252498 A1 | 12/2004 | Gutstein et al. |
| 2004/0257817 A1 | 12/2004 | Philipp |
| 2005/0024744 A1 | 2/2005 | Falicoff et al. |
| 2005/0047127 A1 | 3/2005 | Tutman |
| 2005/0052885 A1 | 3/2005 | Wu |
| 2005/0111217 A1 | 5/2005 | Feng |
| 2005/0128744 A1 | 6/2005 | You et al. |
| 2005/0195606 A1 | 9/2005 | Henoch |
| 2005/0196716 A1 | 9/2005 | Haab et al. |
| 2005/0254248 A1 | 11/2005 | Lederer |
| 2008/0074875 A1 | 3/2008 | Jensen et al. |

FOREIGN PATENT DOCUMENTS

| | | |
|---|---|---|
| EP | 1 281 406 | 2/2003 |
| EP | 1376708 A2 | 1/2004 |
| FR | 2628825 | 9/1989 |
| FR | 2795485 | 12/2000 |
| GB | 2 347 563 | 9/2000 |
| GB | 2 388 653 | 11/2003 |
| JP | 5 408 2864 | 7/1979 |
| JP | 01-243483 | 9/1989 |
| JP | 06052709 | 2/1994 |
| JP | 09106890 | 4/1997 |
| JP | 09204809 | 8/1997 |
| JP | 9-007411 | 10/1997 |
| JP | 11086602 | 3/1999 |
| JP | 2000245617 | 9/2000 |
| JP | 2002270013 | 9/2002 |
| JP | 2003187615 | 7/2003 |

OTHER PUBLICATIONS

Written Opinion in PCT/US2006/038610 dated Mar. 8, 2007.
Candle Impressions® Website (Formerly Candles of Paradise) at http://www.candleim pressions.net/cgi-ole/cs.waframe.homepage dated Nov. 14, 2005 (1 page).
Webpage http://www.candleimpressions.net/cgi-cs/cs.waframe. menu?lang=1&topic=19189&click=. . . dated Nov. 14, 2005 (1 page).
Webpage http://www.candleimpressions.net/cgi-cs/cs.waframe. submenu?topic=19189&img_num=. . . dated Nov. 14, 2005 (1 page).
"Welcome to our Candles of Paradise Web Site," at http://www.candleimpressions.net/cgi-cs/cs.waframe. content?topic=19189img_num=& . . . dated Nov. 14, 2005 (1 page).
"Battery Operated Flickering Wax Candles," at http://www.candleimpressions.net/cgi-cs/cs.waframe.content?topic=19538 &lang=1 dated Nov. 14, 2005 (3 pages).
"Battery Operated Flickering Wax Candles with Candle Holders," at http://www.candleimpressions.net/cgi-cs/cs.waframe.content-?topic=26227&lang=1 dated Nov. 14, 2005 (3 pages).
"Battery Operated Wall Sconces with Flameless Wax Candles," at http://www.candleimpressions.net/cgi-cs/cs.waframe.content-?topic=26221&lang=1 dated Nov. 14, 2005 (2 pages).
"Battery Operated Flickering Candle Light Fixtures," at http://www.candleim pressions.net/cgi-cs.waframe.content?topic=19541 &lang=1 dated Nov. 14, 2005 (5 pages).
"Solar Operated Flickering Candle Light Fixtures," at http://www.candleim pressions.net/cgi-cs/cs.waframe.content?topic=19542 &lang=1 dated Nov. 14, 2005 (1 page).
"Candle Fire Safety," at http://www.candleimpressions.net/cgi-cs/cs.waframe.content?topic=19530&img_num=2 dated Nov. 14, 2005 (1 page).
Photographs of "Everlasting Tealights" packaging and device—Made in China, designed and imported by the Gerson Company—Olathe, KS, (5 pages).
Photograph of "Corona Extra Bottle Luminary", date unknown.
Photograph of "Rose Luminary", date unknown.

Fig. 8
Fig. 9
Fig. 10
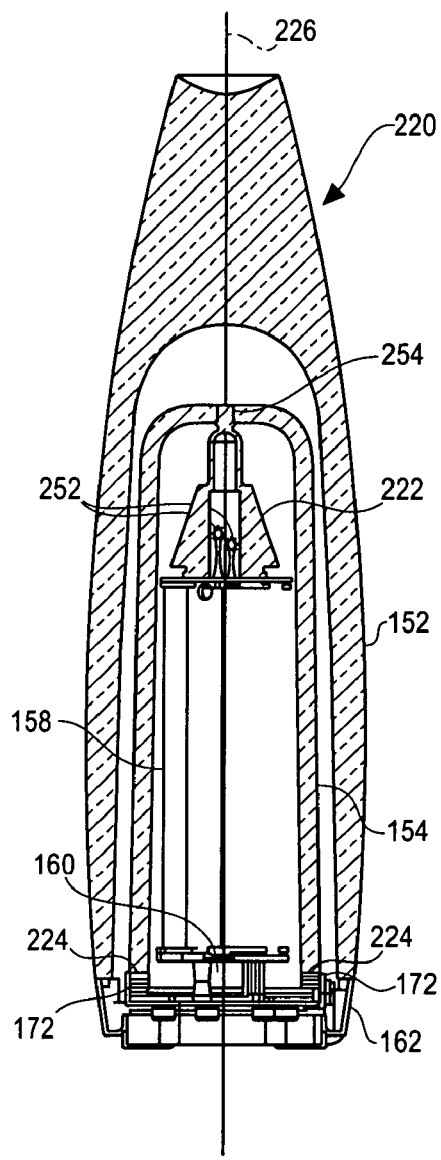
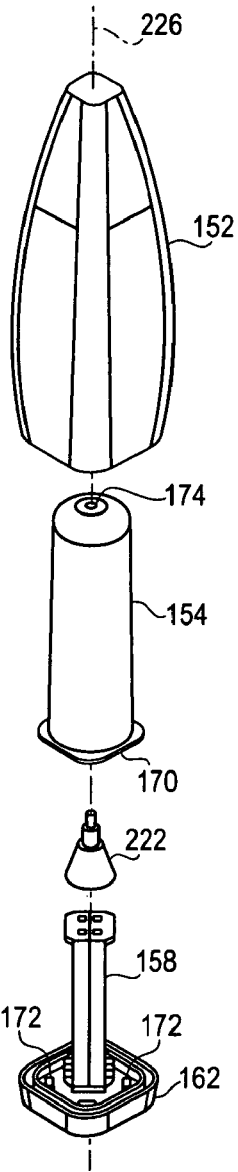
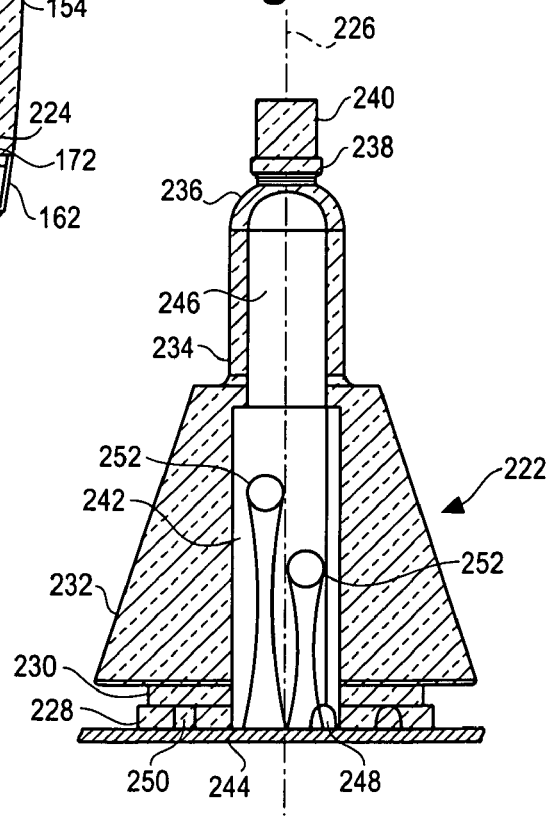

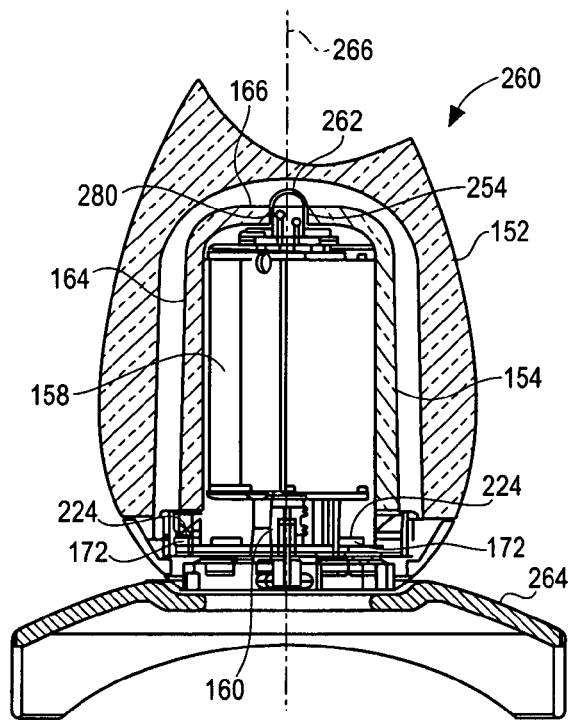
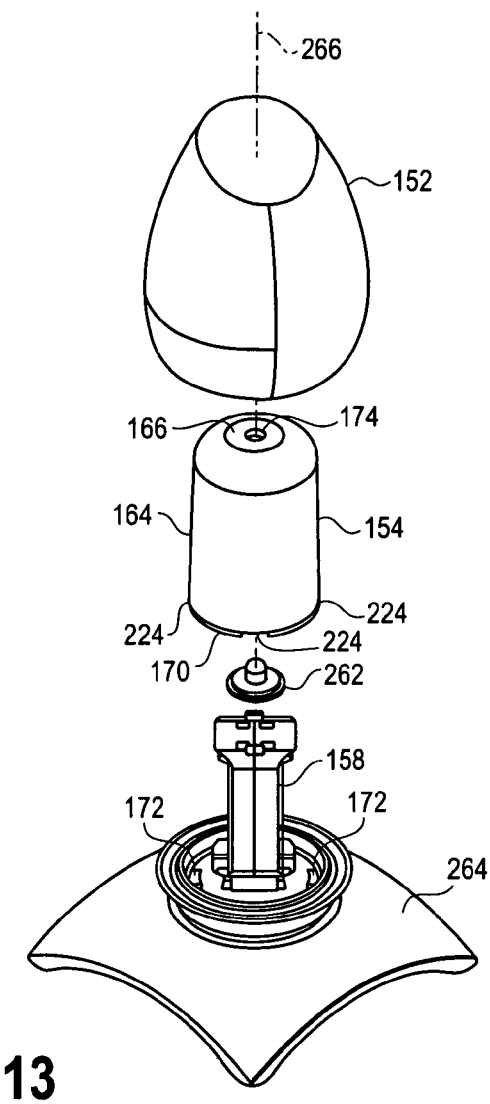
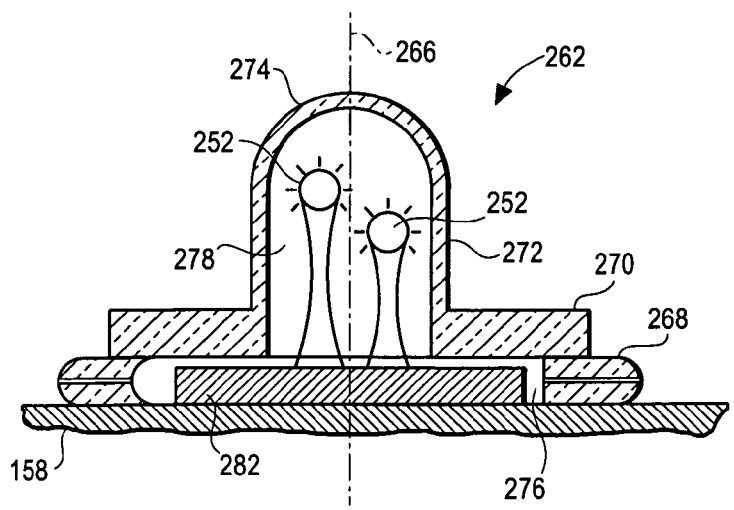

LIGHT APPARATUS

CROSS REFERENCE TO RELATED APPLICATIONS

This application claims the benefit of U.S. Patent Application No. 60/723,166, filed Oct. 3, 2005. This application is also a continuation-in-part of U.S. patent application Ser. No. 11/265,738, filed Nov. 2, 2005, and U.S. patent application Ser. No. 11/485,071 filed Jul. 12, 2006, each of which claims the benefit of U.S. Patent Application No. 60/723,166, filed Oct. 3, 2005. Each of the above-indicated applications is incorporated by reference herein in its entirety.

REFERENCE REGARDING FEDERALLY SPONSORED RESEARCH OR DEVELOPMENT

Not applicable

SEQUENTIAL LISTING

Not applicable

BACKGROUND

1. Field

The present invention relates to a lighting apparatus for producing one or more visually discernable lighting effects and light control devices that may be used with the lighting apparatus.

2. Background of the Invention

Lighting devices that use light control devices, such as for example light pipes, light diffusers, and/or lenses, for transferring and manipulating light from one point light source to another location are known. In one example, a point light source, such as an incandescent light bulb, is disposed inside an opaque housing. Long, thin strands of hollow fiber optic tubing have one end located near the light bulb and an opposite end disposed in or through the housing. Light from the light bulb is transferred through the fiber optic tubing to the opposite end to provide a plurality of points of light around the exterior of the housing.

Another light apparatus has an LED disposed in an end cavity of a bullet-shaped light pipe, which is in turn disposed inside an end cavity of an outer diffuser shaped to resemble a flame. The outer surface of the bullet-shaped light pipe abuts against an inner surface of the outer diffuser, and power circuitry for the LED is carried below the outer diffuser and inner light pipe by a base.

Yet another luminary device has a base, which carries a light bulb and attendant power and control circuitry therefor. A solid light pipe having a decorative shape, such as a flower or a bottle, is disposed on top of the base above the light bulb. Light from the light bulb enters a base portion of the light pipe and is transferred therethrough to illuminate the entire light pipe.

SUMMARY OF THE INVENTION

According to one aspect of the invention, a light apparatus includes a light pipe having a substantially smooth longitudinal exterior surface extending between a first end and a second end, a light source disposed at the first end, and a facet disposed at the second end, wherein the facet is angularly disposed from a longitudinal axis of the light pipe. Light from the light source is transmitted through the light pipe from the light source and dispersed radially outwardly from the longitudinal axis by the facet.

According to another aspect of the invention, a light pipe includes a solid transparent pipe having a longitudinal axis extending between a first end and a second end and a cavity defined in the first end. The pipe has a substantially smooth longitudinal exterior surface, and the cavity is adapted to receive at least one light source therein. A facet is disposed at the second end. The facet is angularly disposed from the longitudinal axis of the light pipe so as to reflect light transmitted from the cavity laterally outwardly from the pipe and so as to transmit light longitudinally through the second end.

According to a further aspect of the invention, a lighting apparatus includes a light source further comprising power circuitry and a light pipe further comprising a sidewall defining an interior space and a bottom end. The bottom end is disposed adjacent the light source and the power circuitry is disposed in the interior space.

Other aspects of the present invention will become apparent upon consideration of the following detailed description.

BRIEF DESCRIPTION OF THE DRAWINGS

FIG. 8 is a cross-sectional view of a light apparatus according to another embodiment of the invention;

FIG. 9 is a partially exploded, isometric view of the light apparatus of FIG. 8;

FIG. 10 is an enlarged cross-sectional view of a light diffuser in the light apparatus of FIG. 8;

FIG. 11 is a partially exploded, isometric view of a light apparatus according to a further embodiment of the invention;

FIG. 12 is a cross-sectional view the light apparatus of FIG. 11;

FIG. 13 is an enlarged cross-sectional view of a light diffuser in the light apparatus of FIG. 11;

DETAILED DESCRIPTION OF THE DRAWINGS

It is contemplated that the various features and components of any one of the embodiments described herein may be combined with any or all of the other embodiments described herein. Further, like reference numbers used to describe the various embodiments in different drawings refer to similar structures.

Figure 1:
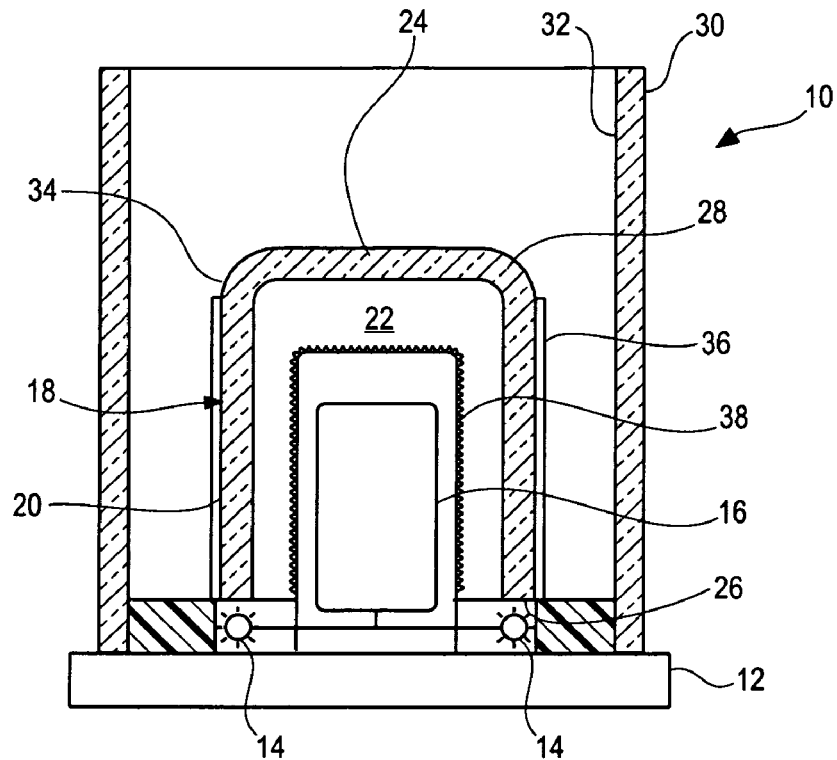
FIG. 1 is a diagrammatic cross-sectional view of a light apparatus according to one embodiment of the invention.

Turning now to the drawings, FIG. 1 shows a light apparatus 10 including a light control device according to one embodiment of the present disclosure. The light apparatus 10 includes a base 12, which carries one or more lights 14, such as light emitting diodes (LEDs), and a power and/or control circuit 16 for actuating the lights 14 extending upwardly from a central position on the base. A hollow light pipe 18 having a sidewall 20 that defines an interior space 22 and a top wall 24 extending across a top end of the sidewall is disposed over the lights 14 such that a bottom end surface 26 of the sidewall is located directly adjacently above the lights and at least a portion of the control circuit 16 is disposed within the interior space 22. The hollow light pipe 18 includes a curved light guiding transition 28, such as a rounded corner, which changes the direction of light transmitted therealong through angles up to at least 90 degrees disposed at the junction between the sidewall 20 and the top wall 24. The curved light guiding transition 28 has an inner radius at least as large as or larger than twice a thickness of an adjacent portion of the sidewall and an outer radius at least as large as the sum of the inner radius plus the respective thickness of the sidewall in order to retain a large portion of the light within the light pipe 18 along the curved transition. Further, the curved light transition 28 has a thickness at or near the sidewall 20 that is greater than the thickness at or near the top wall 24, which may provide a larger interior space 22 for receiving control and power components therein. In other embodiments, the junction may have other shapes, such as a square corner, a flat diagonal facet, and/or include a plurality of flat and/or curved facets. The sidewall 20 and top wall 24 are formed of a sufficiently light transmissive material, such as glass and/or a polymer resin, such that the hollow light pipe 18 in one embodiment is transparent and in another embodiment is translucent. The base 12 carries the hollow light pipe 18 in any suitable manner, such as with a ledge or bracket, such that the bottom end surface 26 of the sidewall 20 is disposed directly adjacent to the lights 14. A light transmissive outer shell 30 surrounds the hollow light pipe 18 and is carried by the base 12. The outer shell 30 is disposed on the base 12 such that an interior surface 32 of the outer shell is spaced from the hollow light pipe 18. Illustratively, the interior surface 32 of the outer shell 30 and the sidewall 20 of the light pipe are similarly shaped so as to provide a generally constant distance therebetween as compared with a distance between the lights 14 and the interior surface of the outer shell. For example, both the sidewall 20 of the hollow light pipe 18 and the interior surface 32 of the outer shell 30 may be generally rectangular in one embodiment and in other embodiments both may be generally cylindrical, spherical, triangular, or otherwise similarly shaped. In yet another embodiment, the distance between the hollow light pipe 18 and the interior surface 32 of the outer shell 30 may have some variations, such as, for example, having a cylindrical light pipe disposed inside a spherical or square interior surface of the outer shell, in which case the distance between the two, although not exactly constant, is still relatively constant, because the distance is substantially more constant than the distance between the lights 14 and the interior surface of the outer shell. In a further embodiment (not shown), the light pipe 18 may omit the top wall 24 to have an open top end, and the outer shell 30 may be omitted.

In use, the control circuit 16 is used to activate and deactivate one or more of the lights 14. When the lights 14 are activated, light enters the bottom end surface 26 of the sidewall 20 and a portion of the light is transferred through the sidewall toward and into the top wall 24. The light transferred through the sidewall 20 and top wall 24 of the light pipe 18 exits the light pipe at various locations therealong and passes through the outer shell 30. In this embodiment, a large area of relatively uniform intensity light is passed through the outer shell 30 with a minimum of variation between high intensity areas and low intensity areas along the entire surface of the outer shell. In one embodiment, the lights 14 include a plurality of different colors and the control circuit 16 may control the lights to create a light show of changing colors in a manner similar to that disclosed in U.S. Pat. No. 6,016,038, for example. By combining the outer shell 30, the hollow light pipe 18, and the lights 14, a relatively small number of lights may be used to create a larger and relatively uniformly distributed light show or effect as viewed through the outer shell. In addition, an outer surface 34 of the hollow light pipe 18 may be polished smooth, glazed, and/or frosted, such as by sand blasting, to form a generally lambertian surface to further enhance the distribution of light dispersed through the outer shell 30. The frosted surface also may hide the control circuitry 16 from view from an exterior location to further enhance the aesthetic quality of the light apparatus 10. In one embodiment, the outer surface 34 at the bottom end is polished for a length sufficient to promote color mixing from different colored lights, and the remaining portions of the outer surface are frosted to create a more uniform light dispersion. The hollow light pipe 18 may be formed of any substantially transparent or translucent material, such as glass, polymer resin, etc., suitable for transferring light from the lights 14 therethrough. Similarly, the outer shell 30 may be formed of a transparent or translucent light transmissive material suitable for transferring the light therethrough and may be polished smooth and/or frosted on the inner surface and/or the outer surface thereof. In one embodiment, light sources are additionally or alternatively disposed under a lower end of the outer shell 30, which is made of a light transmissive material and has a surface treatment, such as being frosted, completely covering an interior and/or exterior surface thereof. Further, portions of the hollow light pipe 18 and/or the outer shell 30 may include opaque sections, such as from paint, etchings, and/or decals, to form visible indicia designs, and/or other visible outlines in the light shown through the outer shell. For example, a thin walled, partially translucent plastic or paper cover 36 with a printed, embossed, and/or surface treated design thereon may cover the light pipe 18, thereby helping to conceal the control circuit 16 and transmit a visual design onto the outer shell 30. The cover 36 may be removable and replaceable so that different designs may be used with the light apparatus 10. In addition, a treatment 38, such as for example, a plastic or paper label or paint, covers the control circuit 16, which treatment reduces strong shadows or light spots thereon. The treatment 38 may include, for example, reflective light blocking materials, partially translucent materials, surface scuffing, and/or sandblasting.

Figure 2:
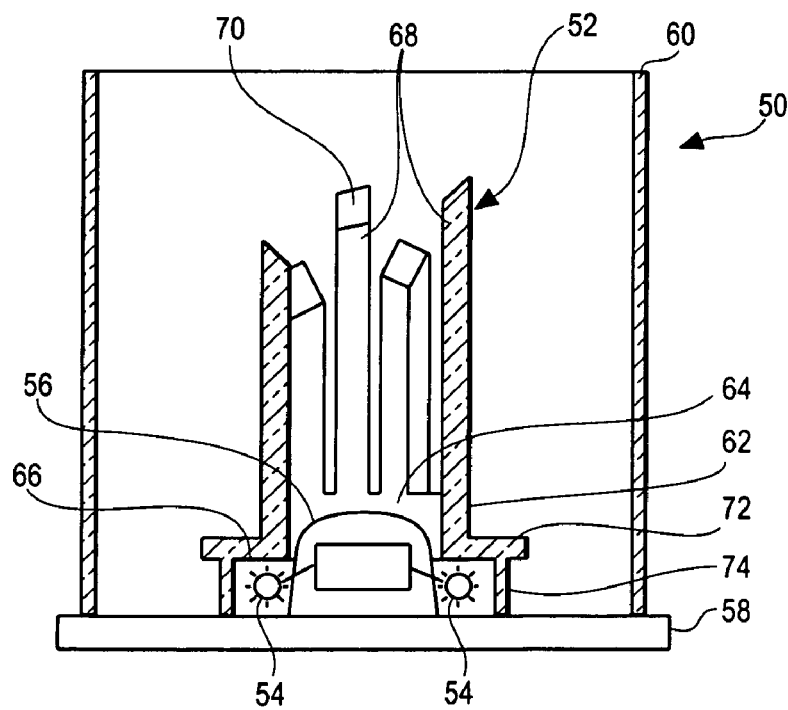
FIG. 2 is a diagrammatic cross-sectional view of a light apparatus according to another embodiment of the invention.

Turning now to FIG. 2, another light apparatus 50 according to the present disclosure includes a hollow light pipe 52 disposed over a plurality of lights 54 and surrounding a power and/or control circuit 56 for the light sources. The control circuit 56, lights 54, and hollow light pipe 52 are carried in a central portion of a base 58. A light transmissive outer shell 60 is spaced from and surrounds the hollow light pipe 52 and is carried by the base 58. The hollow light pipe 52 is formed of a light transmissive material and has a sidewall 62 surrounding an interior space 64 within which the control circuitry 56 is disposed. A light-receiving end surface 66 of the sidewall 62 is disposed directly adjacent to and above the lights 54 to receive light therefrom into the sidewall in a manner similar to that described previously herein. A plurality of circumferentially spaced columns 68 extends upwardly from an upper end of the sidewall 62. The columns 68 have a plurality of different heights, and each column includes a beveled upper end forming a light reflective facet 70 angled in such a manner as to reflect a portion of light from the lights 54 radially outwardly toward the outer shell 60 and may transmit a portion of the light through the upper end. The hollow light pipe 52 in one embodiment has a smooth and polished exterior surface and in another embodiment may have a frosted outer surface. When viewed from a side through the outer shell 60, the hollow light pipe 52 creates an effect of a plurality of high intensity light areas, or "hot spots," disposed at a plurality of different heights, which in one embodiment may be suggestive of a city skyline at night. A peripheral flange 72 extends around the light-receiving end surface 66 of the sidewall 62, and a skirt section 74 extends downwardly from the flange to surround the lights 54 and rest on the base 58. The hollow light pipe 52 may help hide the control circuitry 56 and LED's 54 from direct view by a user from one or more exterior positions. Further, the outer shell 60 may have a frosted surface to further diffuse light transmitted by the hollow light pipe 52 and hide the hollow light pipe, control circuit 56, and lights 54 from direct view by user. The control circuit 56 may be adapted to cause the lights to emit different colored light and/or in various lighting patterns in a manner similar to that described in, for example, Mueller et al. U.S. Pat. No. 6,016,038, the disclosure of which is hereby incorporated by reference herein.

Figure 3:
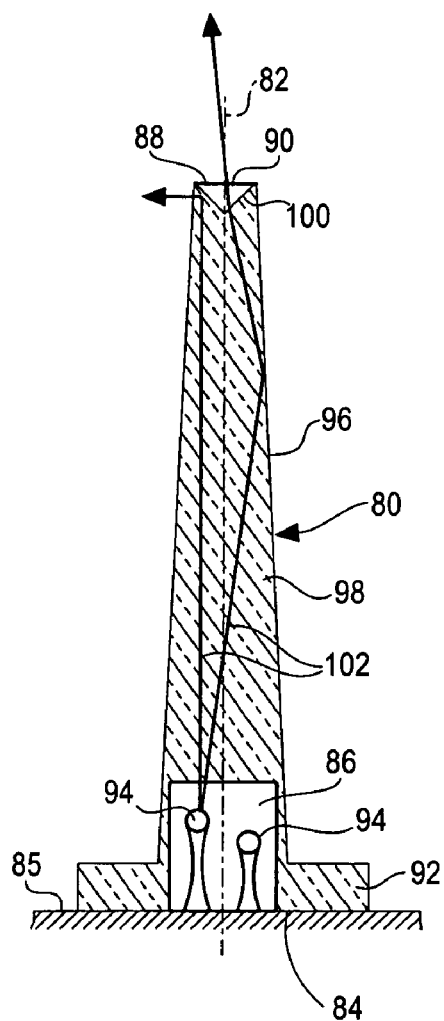
FIG. 3 is a cross-sectional view of a light pipe according to a further embodiment of the invention.
Figure 4:
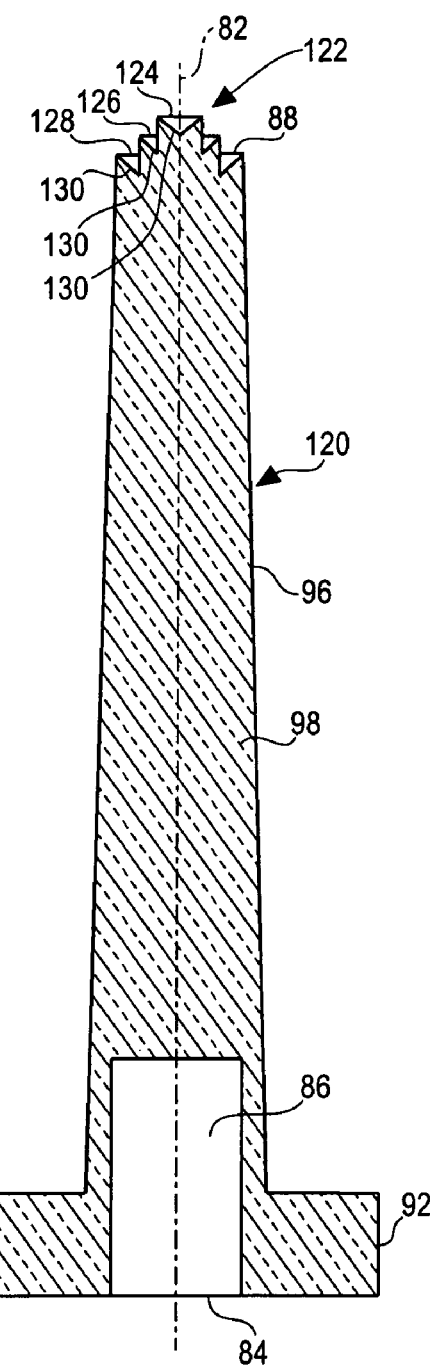
FIG. 4 is a cross-sectional view of a light pipe according to a still further embodiment of the invention.

Each of FIGS. 3 and 4 shows a longitudinal solid core light pipe that transmits light therethrough from a light receiving end to an opposite light dispersion end where a facet both reflects the transmitted light laterally, or radially outwardly, and transmits a portion of the light longitudinally therethrough. The solid core light pipes are suitable for use in various light apparatus alone and/or in combination with other light pipes, such as those shown in FIGS. 1 and 2 and elsewhere herein. In an embodiment shown in FIG. 3, a straight solid core light pipe 80 extends along a straight longitudinal axis 82 between a light receiving end 84 having a cavity 86 disposed therein and a light dispersion end 88 having a reflective facet 90 disposed therein. The solid core light pipe 80 is made of a transparent or translucent material suitable for transmitting light from the light-receiving end to the light dispersion end, such as glass and/or a polymeric resin. A base portion 92, such as an annular flange, is disposed around the light-receiving end 84. The cavity 86 is sized to receive one or more light sources, such as LED's 94, therein with the base portion 92 resting on a support surface 85, such as a printed circuit board (PCB) for powering and controlling the LED's. The solid core light pipe 80 has a substantially smooth or polished tapered or frustoconical exterior surface 96 extending between the base portion 92 and the light dispersion end 88 and has a solid core 98 extending between the reflective facet 90 and the cavity 86. In one embodiment, the cavity 86 has a height as tall as or shorter than the LEDs 94 such that the LEDs engage the solid core and in another embodiment, the cavity is taller than the LED's. In yet another embodiment, the light pipe 80 may be cylindrical, or have non-circular cross-sectional shapes. The reflective facet 90 has the shape of a conical depression extending across and into the light dispersion end. The conical depression forms a reflective surface 100 angularly displaced from the longitudinal axis 82 so as to disperse a portion of transmitted light from the LEDs laterally, or radially outwardly. Illustratively, transmitted light 102 from the LED's 94 is both reflected radially outwardly off the reflective facet 90 and transmitted longitudinally through the reflective facet, thereby dispersing the transmitted light across a large range of angles. In one embodiment, the reflective surface 100 is angularly displaced 45° from the longitudinal axis 82, and in other embodiments, the reflective surface may be angularly displaced at larger or smaller angles from the longitudinal axis in order to adjust the angular dispersion of the transmitted light. For example, an angle of 20° or 30° may transmit and reflect a larger portion of light upwardly. In one embodiment, the transmitted light is transmitted through the core 98 by internal reflection at the exterior surface 96 and is dispersed at the reflective facet 90 by internal reflection off of and transmission through the reflective surface 100. The core 98 may take a variety of sizes such as the relatively tall, thin proportions shown in FIG. 3 and relatively short and thick portions, such as the solid light pipe shown in FIGS. 5 and 6. In addition, the solid core light pipes do not necessarily have to be straight lengths as shown in the drawings, but may include curves or bends along the longitudinal lengths thereof and may be used to transmit light from a light source in any direction, such as up, down, and/or horizontally.

Turning now to FIG. 4, another straight solid core light pipe 120 is shown, which is similar to the light pipe of FIG. 4 in that it includes a base portion 92 and a solid core 98 extended along a straight longitudinal axis 82 between a light-receiving end 84 and a light-dispersion end 88. A cavity 86 is disposed at the light-receiving end 84 shaped to receive one or more lights, such as LED's (not shown), therein. A reflective facet 122 is disposed at the light-dispersion end 88 to disperse light from the LED's both radially outwardly and longitudinally therethrough as previously described with regard to FIG. 3. The reflective facet 122 includes a central conical depression 124 surrounded by a first concentric frustoconical depression 126 and a second concentric frustoconical depression 128 that extend to an exterior surface 96 of the solid core light pipe 120. In other embodiments, the solid core light pipe 120 (and the solid core light pipe 80) may have non-circular shapes and non-conical end facets and surface finishes such as frosting or light blocking or partially light transmissive decals. In one embodiment, for example, the light pipe 120 may have an oval cross-section. The exterior surface 96 is smooth or polished and the core 98 is formed of solid light transmissive material in the same or similar manner as the light pipe 80 shown in FIG. 3. In other embodiments, more or fewer concentric conical and frustoconical depressions 124, 126, 128 may be disposed at the light-dispersion end 88. The central conical depression 124 is longitudinally displaced beyond the end of the adjacent frustoconical depression 126, which is in turn longitudinally displaced beyond the end of the next adjacent frustoconical depression 128, thereby creating a series of steps or longitudinally displaced tiers of reflecting surfaces 130 angularly displaced from the longitudinal axis 82. In one embodiment, each such tier is longitudinally displaced from the adjacent tier or tiers such that the reflecting surface 130 of each depression 124, 126, 128 is disposed longitudinally beyond the end of the outwardly radially adjacent depression, and the reflecting surface 130 formed by each of the conical depression 124 and frustoconcial depressions 126, 128 is angularly displaced from the longitudinal axis 82 at approximately 45°. The reflecting surfaces 130 in other embodiments may be angularly displaced at more than and/or less than 45° from the longitudinal axis 82 as desired to focus and/or disperse light laterally outwardly from the reflective facet 122 at any desired angle as discussed previously herein. Light entering the light-receiving end 84, such as from one or more LEDs disposed in the cavity 86, is transmitted longitudinally along the core 98 by internal reflection off the exterior surface 96 and is reflected radially, or laterally, outwardly off the reflective surfaces 130 and transmitted longitudinally through the reflective surfaces in a manner similar to that described with respect to the reflective surface 100 of FIG. 4.

Figure 5:
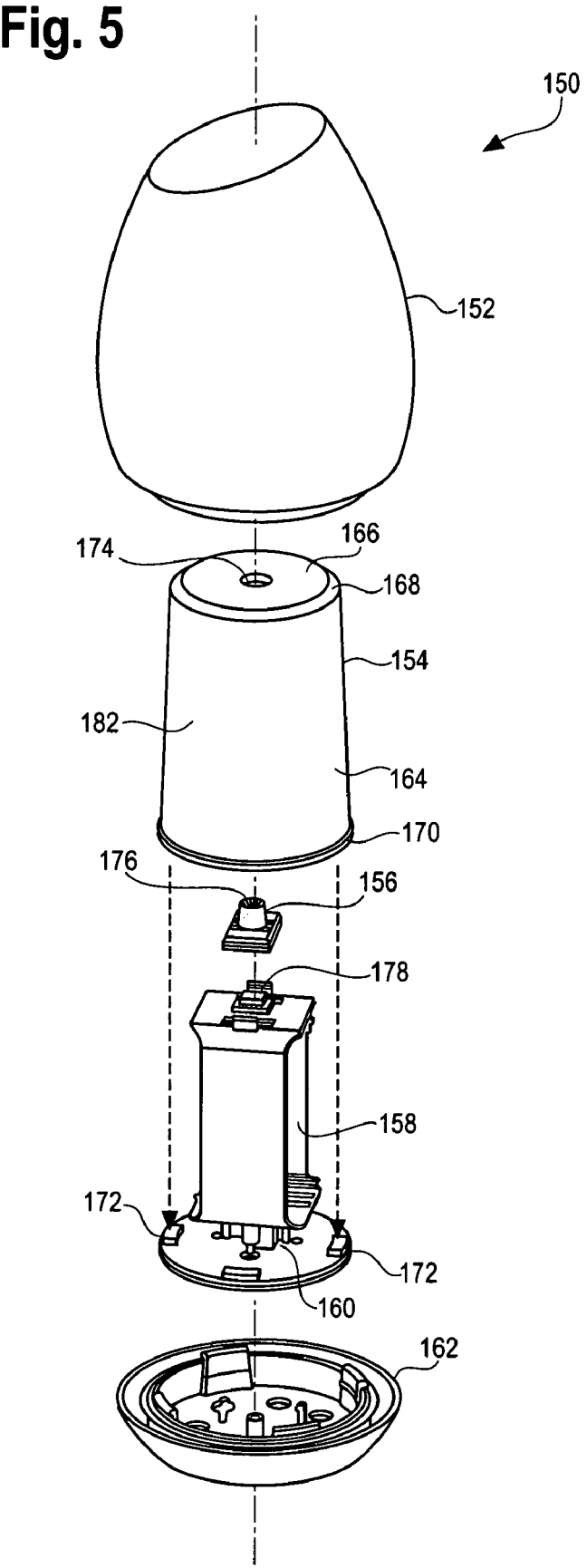
FIG. 5 is an isometric partially exploded view of a light apparatus according to another embodiment of the invention.
Figure 6:
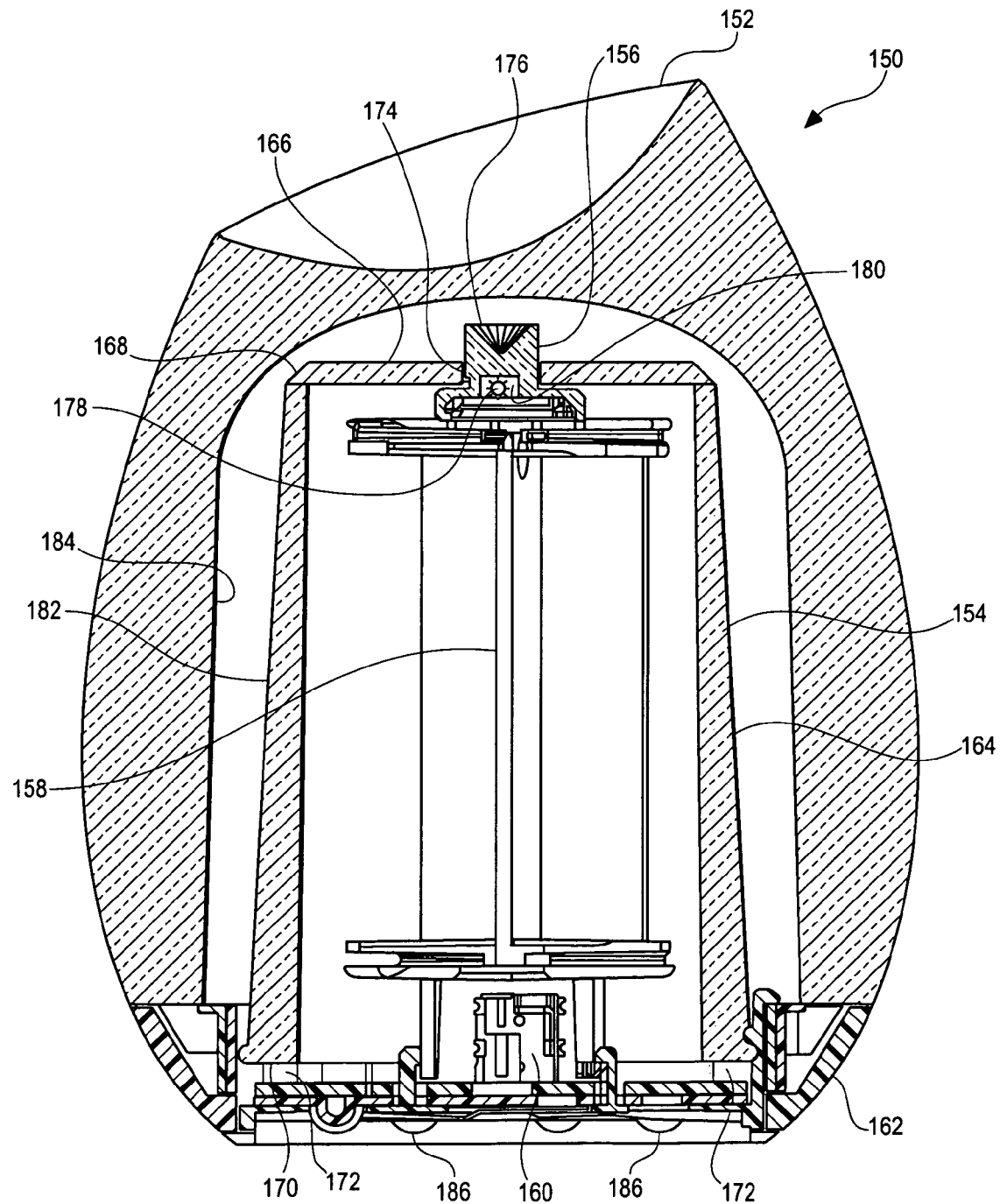
FIG. 6 is a cross-sectional view of the light apparatus of FIG. 5.

In FIGS. 5 and 6, a light apparatus 150 according to another embodiment of the present disclosure includes a light transmissive, egg-shaped or ovate outer shell 152, a hollow light pipe 154 disposed inside the outer shell, a solid core light pipe 156 disposed partly inside the hollow light pipe, a battery compartment 158 and control circuitry 160 disposed at least partly inside the hollow light pipe, and a base 162. The hollow light pipe 154 includes a tapered frustoconical sidewall 164 defining an interior space, a flat top wall 166 extending across a top end of the sidewall, and a beveled outer peripheral edge 168 surrounding the top wall. A flat, bottom end surface 170 of the sidewall 164 is disposed immediately adjacent and above a plurality of light show LED's 172 such that light from the LED's is transmitted directly into the sidewall through the bottom end surface. The hollow light pipe 154 in one embodiment has a frosted surface (exterior and/or interior) both to diffuse light outwardly therefrom and hide the battery compartment and control circuitry from view, and in another embodiment has a polished or smooth surface. The top wall 166 of the hollow light pipe 154 has an opening 174 through which the solid core light pipe 156 extends. The solid core light pipe 156 is generally similar to the solid core light pipe 80 shown in FIG. 3, except for being shorter. The solid core light pipe 156 has a frustoconical core of solid light transmissive material, such as glass, having a straight longitudinal axis extending between a reflective facet, including a depressed conical reflective surface 176, disposed at an upper end thereof. A lower end of the solid core light pipe 156 is disposed on, directly over, or adjacent to one or more flame flicker simulating LED's 178 and is disposed in the interior space of the hollow light pipe 154. In one embodiment, a cavity 180 is disposed in the lower end of the solid core light pipe 156 to accept the one or more flame flicker LED's 178 therein. In another embodiment, the bottom end of the solid core light pipe 156 is flat and the one or more flame flicker LED's 178 are adjacent to or abut the bottom end. The reflective facet is disposed between a radially outer side 182 of the hollow light pipe 154 and a radially inner surface 184 of the outer shell 152. Light from the flame flicker LED's 178 is transmitted upwardly through the solid core light pipe 156 to the reflective facet, where a portion of the transmitted light is reflected laterally outwardly from the reflective surface 176, and another portion of the transmitted light is transmitted longitudinally through the reflective surface. The inner surface 184 of the outer shell 152 is shaped generally complementary to and relatively evenly spaced from the outer surface 182 of the hollow light pipe 154 and the solid core light pipe 156 as described previously herein. The light show LED's 172 are controlled to create a multi-colored light show having substantially continuous visual light produced thereby, and one or more of the flame flicker LED's 178 are controlled to flicker on and off in a manner intended to simulate a flame flicker, as previously described herein. One or more switches 186 in the base 162 are adapted to turn all of the LED's 172, 178 off, or turn the light show LED's 172 on, or turn the flame flicker LED 178 on, and/or switch between different light shows. The switches 186 may further be adapted to turn the flame flicker LED 178 and the light show LEDs 172 on simultaneously and to change between different pre-programmed light shows. The disclosure is not limited to the specific light effects detailed herein, so that, for example, in a further embodiment, different light effects may be created, and/or different light sources, such as incandescent or fluorescent light bulbs, may be used in place of or with the LEDs 172, 178.

Figure 7:
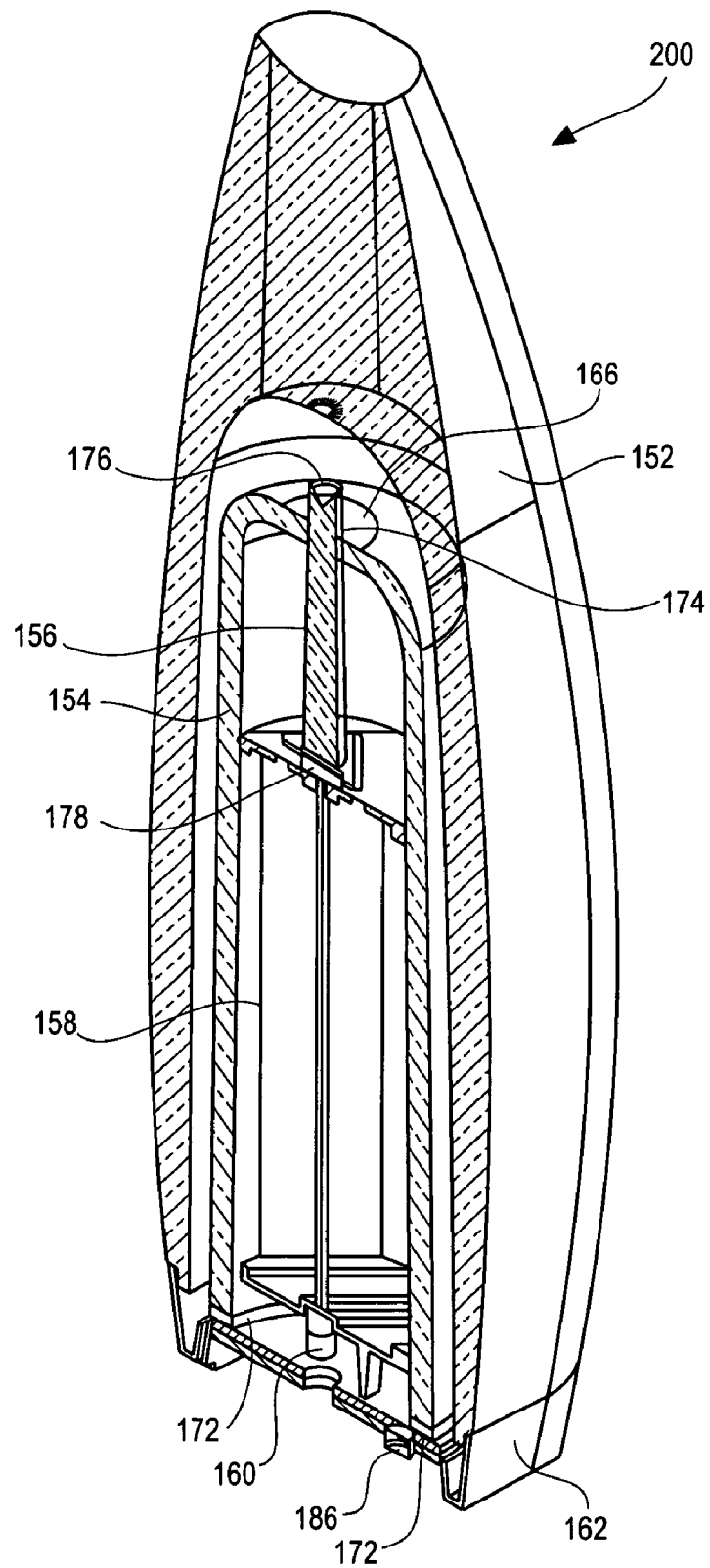
FIG. 7 is an isometric cross-sectional view of a light apparatus according to an additional embodiment of the invention.

In FIG. 7, a lighting apparatus 200, which is generally similar to the lighting apparatus 150 of FIGS. 5 and 6, includes a base 162, which carries a pyramid shaped outer shell 152 surrounding and substantially evenly spaced from a hollow light pipe 154 disposed over a plurality of multi-color light show LEDs 172 and surrounding a battery compartment 158 and control circuitry 160 for the LEDs. One or more flame flicker simulating LEDs 178 are disposed on a top end of the battery compartment 158 and a solid core light pipe 156 similar to the light pipe 80 shown and described in FIG. 3, extends upwardly from the flame flicker LEDs 178 through a hole 174 in a top wall 166 of the hollow light pipe 154. The solid core light pipe 156 has a reflective facet, including a depression forming a conical reflective surface 176 angularly displaced from a longitudinal axis, disposed at a light dispersion end thereof. The reflective surface 176 is disposed above or on an exterior side of a rounded top wall 166 of the hollow light pipe 154 and is angled such that a portion of light transferred from the flame flicker LED 178 through the solid core is reflected downwardly against the exterior surface of the top wall of the hollow light pipe, another portion of the light is reflected laterally or radially outwardly through the outer shell 152, and still another portion of the light is transferred longitudinally through the reflective surface and through the outer shell. Such an arrangement of the reflective facet above the top wall 166 of the hollow light pipe 154 may cause the resulting observed light concentration to appear larger to an observer due to the added reflection off the exterior surface of the hollow light pipe and thereby create a more pleasing visual effect, such as by simulating a real flame. The LEDs 172, 178 may be controlled by one or more switches 186 connected to the control circuitry 160 that are adapted to turn the various LED's on and off and switch between a plurality of different light effects, such as one or more different color light shows through the hollow light pipe 154 and/or a flame flicker effect through the solid core light pipe 156 as previously described herein.

In another embodiment, the solid core light pipe 156 may have different reflective facets or may be the solid core light pipes 80, 120 shown in FIG. 3 or FIG. 4. In a further embodiment, an annular surface of the hole 174 through the top wall 166 of the hollow light pipe 154 is optically separated from the solid core light pipe 156 with an opaque covering, such as paint, tape, an opaque film, and/or a rubber grommet, for example. In addition, the exterior and/or interior surfaces of the outer shell 152, the hollow light pipe 154, and the solid core light pipe 156 may be frosted and/or polished smooth. In yet another embodiment, the power circuitry 160 for powering the various LEDs 172, 178 includes a recharging plug (not shown) and appropriate circuitry for recharging rechargeable batteries. The recharging plug is disposed underneath the base 162 so as to be hidden from view when the light apparatus 200 is in an upright position. In an even further embodiment, a second solid core light pipe (not shown) extends from another LED disposed in the interior of the hollow light pipe horizontally through the sidewall thereof, and a third solid core light pipe (not shown) has a light receiving end disposed adjacent the light show LEDs 172 to transmit light therefrom to another point, either inside or outside of the hollow light pipe 154.

In FIGS. 8-10, another light apparatus 220 is shown, which is generally similar to the light apparatus 200, except that the solid core light pipe 156 is replaced with a light diffuser 222. The light apparatus includes a base 162, which carries a pyramid shaped outer shell 152 surrounding and spaced from a hollow light pipe 154 disposed over a plurality of multi-color light show LEDs 172 and surrounding a battery compartment 158 and control circuitry 160 for the LEDs. The hollow light pipe 154 includes a plurality of recesses 224 disposed in a bottom end surface 170 thereof to receive the LEDs 172 therein. The diffuser 222, best shown in FIG. 10, is formed of a translucent light transmissive material, such as a milky white polymer, and has disposed along a common longitudinal axis 226 a circular base flange 228, a cylindrical portion 230 extending upwardly from the base flange, a frustoconical portion 232 extending above the cylindrical portion, a cylindrical tube portion 234 extending above the frustoconical portion, a hemispherical dome portion 236 at an upper end of the tube portion, a second cylindrical flange 238 disposed on top of the dome portion, and a top cylindrical portion 240 disposed on top of the second cylindrical flange. The frustoconical portion 232 tapers inwardly from the cylindrical portion 230 toward the tube portion 234 to simulate the tapering shape of a flame. A first axially aligned hollow bore 242 extends from an opening 244 in the base flange 228 almost entirely through the frustoconical portion 232. A second axially aligned hollow bore 246 smaller than the first hollow bore 242 extends from the first hollow bore into the dome portion 236 and has a rounded end complementary to the dome portion. The second flange 238 and the top cylindrical portion 240 are substantially solid. A plurality of channels 248 are disposed on an under side of the base flange 228, and a plurality of grooves 250 are disposed on an outer circumference of the base flange 228. The top cylindrical portion 240 extends through a complementary shaped opening 174 through a top wall of the hollow light pipe 154 with the top end thereof coincident with the outer surface of the hollow light pipe and the second flange 228 abutting an inner surface thereof to help retain the diffuser in an upright position. Several LED's 252 (preferably, one or more having a constant light and one or more having a flickering light) extend upwardly into the first bore 242, and when turned on, glow through the diffuser 222 to simulate a flame flicker therethrough. The light apparatus includes light show controls and flame flicker controls for the LED's 172 and the LED's 252, respectively, as described previously herein. An inner surface of the opening 174 is preferably covered with an opaque substance, such as black paint, to provide a light barrier 254 between the light diffuser 222 and the hollow light pipe 154 to eliminate or reduce bright spots at the top cylindrical portion 240 when light is directed through the hollow light pipe 154.

In FIGS. 11-13, another light apparatus 260 is shown, which is generally similar to the light apparatus 150, except that the light pipe 156 is replaced with a light diffuser 262, the base 162 is replaced with a different base 264, and the hollow light pipe has a rounded transition between the sidewall 164 and the top wall 166. The light apparatus includes an egg shaped or ovate light transmissive outer shell 152 carried by the base 264 and surrounding and spaced substantially evenly from a hollow light pipe 154. The hollow light pipe 154 is disposed over a plurality of multi-color light show LED's 172 and surrounds a battery compartment 158 and control circuitry 160 for the LED's. The hollow light pipe 154 includes a plurality of recesses 224 disposed in a bottom end surface 170 thereof, which receive the LED's 172 therein. The diffuser 262, best shown in FIG. 13, is formed of a translucent light transmissive material and has disposed along a common longitudinal axis 266 a cylindrical base flange 268, a second, smaller cylindrical flange 270 disposed on top of the base flange, a cylindrical tube 272 extending up from the second flange, and a hemispherical dome portion 274 disposed on top of the tube portion. An axially aligned cylindrical bore 276 extends through the base flange 268, and a second axially aligned cylindrical bore 278 extends through the second flange 270 to a rounded end disposed inside the dome portion 274 and complementary thereto. The dome portion 274 extends through and above a complementary shaped opening 174 through the top 166 wall of the hollow light pipe 154. A plurality of flame-flicker effect LED's 252 extend into the second bore 278 from a circuit board 282, which in one embodiment is disposed in the bore 276. The light apparatus 260 includes light show controls and flame flicker controls for the LED's 172 and the LED's 252, respectively, as described previously herein. A light barrier 254 may be disposed between the diffuser 262 and an inner surface of the opening 174, such as with paint or an opaque film, to prevent light from traveling between the diffuser 262 and the hollow light pipe 154 at the opening 174. The light barrier may eliminate or reduce bright spots at the dome portion 274 when light is directed through the hollow light pipe 154.

Figure 14:
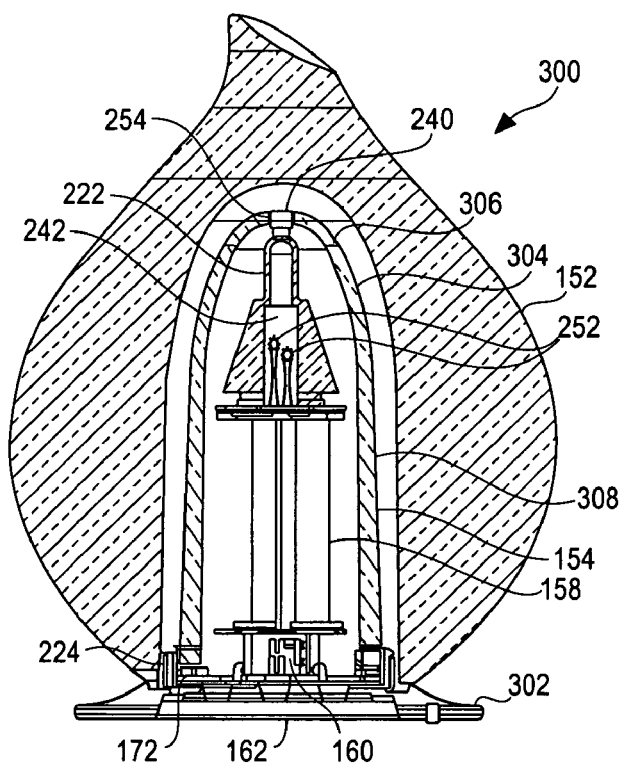
FIG. 14 is a cross-sectional view of a light apparatus according to yet another embodiment of the invention.
Figure 15:
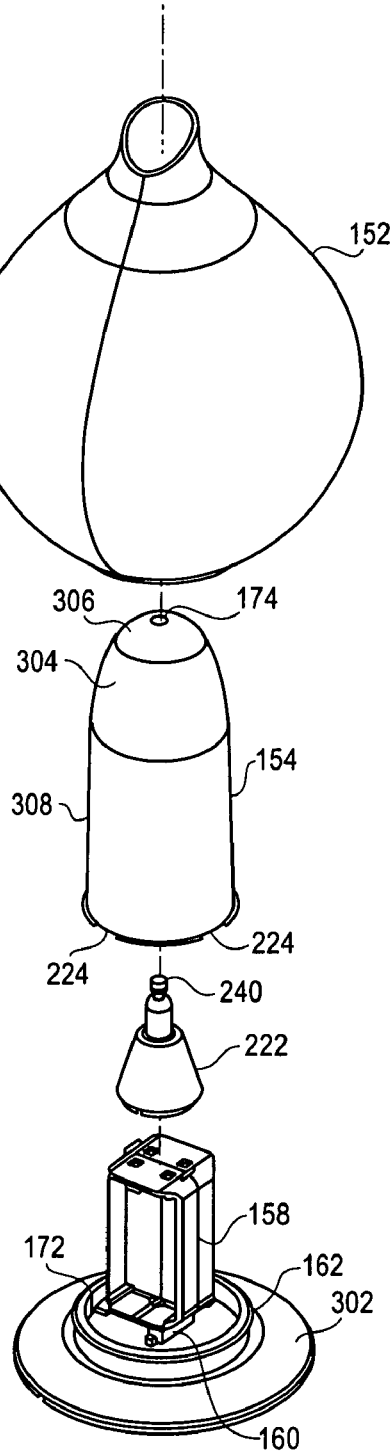
FIG. 15 is a partially exploded, isometric view of the light apparatus of FIG. 14.

In FIGS. 14 and 15, another light apparatus 300 is shown, which is similar to the light apparatus 220 except that the outer shell 152 has an outer surface shaped like an onion, the base 162 includes a flange portion 302, and the hollow light pipe 154 has a bullet shape including a tapered transition wall 304 extending between a rounded top wall 306 and a substantially frustoconical or cylindrical bottom wall 308. The transition wall 304, a portion of the top wall 306, and, possibly, the bottom wall 308 preferably have inside radial dimensions larger than twice a thickness of the respective walls 304, 306, and 308 and outside radial dimensions that are at least as large as the sum of the respective inside radial dimensions and wall thicknesses. The transition and top walls 304 and 306 preferably also transition between a smaller thickness toward an apex of the top wall 306 and a larger thickness toward the bottom wall 308. A plurality of recesses 224 is disposed in an end surface of the bottom wall 308 to receive a respective plurality of LEDs 172 disposed in the base 162. The outer surface of the hollow light pipe 154 is substantially complementary to and spaced from the interior surface of the outer shell 152, which in one embodiment has a frosted surface treatment. A light diffuser 222, which is substantially the same as the light diffuser 222 shown in FIG. 10, is disposed over a battery compartment 158 and has a top portion 240 that extends into an opening 174 through the apex of the hollow light pipe 154. In one embodiment, a light barrier 254 surrounds the top portion 240 of the diffuser 222 between the top wall 306 of the hollow light pipe 154. A plurality of flame flicker LEDs 252 is disposed inside a lower bore 242 of the light diffuser 222. The LEDs 172 and 252 are controlled by appropriate power controls 160 to provide a light show through the hollow light pipe 154 and a flame flicker effect through the light diffuser 222 in a manner similar that described previously herein.

Figure 16:
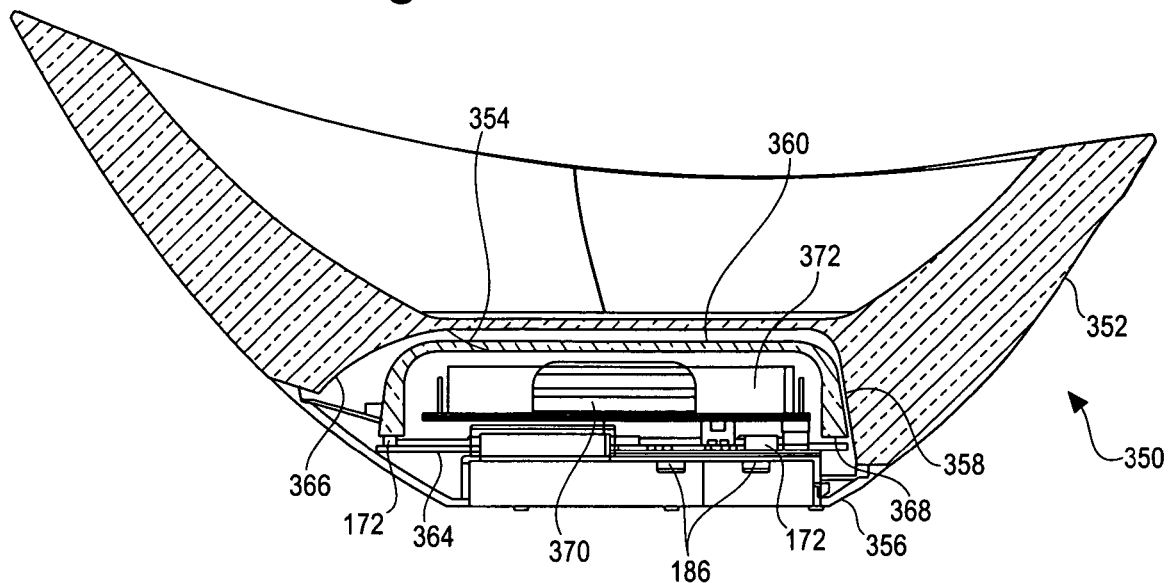
FIG. 16 is a cross-sectional view of a light apparatus according to yet a further embodiment of the invention.
Figure 17:
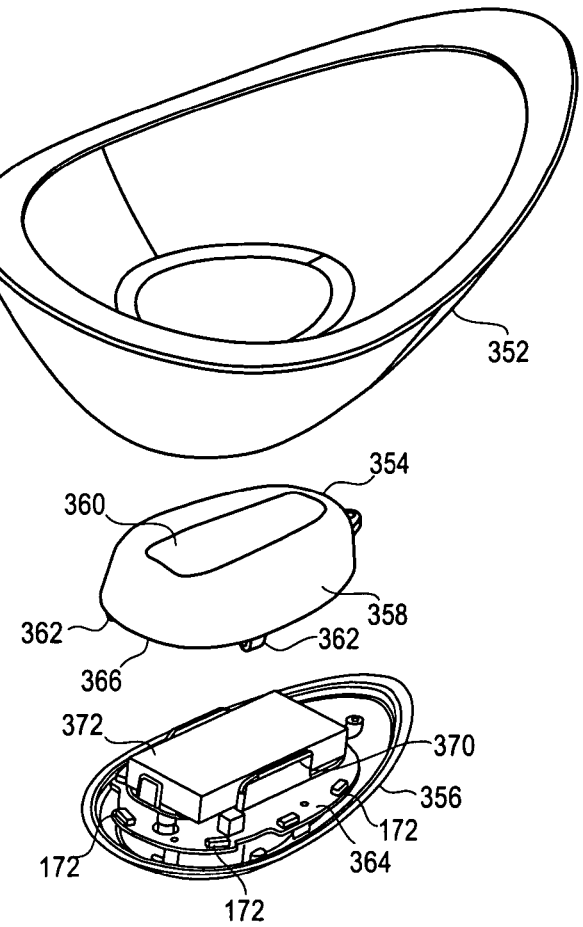
FIG. 17 is a partially exploded, isometric view of the light apparatus of FIG. 16.

In FIGS. 16 and 17, another light apparatus 350 is shown, which has a bowl-shaped, light transmissive outer shell 352 covering a light transmissive hollow light pipe 354 and carried by a base 356. The light pipe 354 is preferably made of transparent material and has a smooth peripheral sidewall 358 extending downwardly from a smooth top wall 360 and a curved transition therebetween. Preferably, the peripheral sidewall 358 tapers between a larger thickness near the base 356 and a smaller thickness at the top wall 360, and the curved transition has an inside transverse dimension (measured from a centerline of the light pipe 354 as seen in FIG. 16) at least two times the thickness of the sidewall. A plurality of engagement hooks or tabs 362 for retaining the light pipe in a preselected position over a circuit board 364 extend from the peripheral sidewall 358. The outer shell 352 includes a recess in an underside thereof defining an inner surface 366 that is spaced from and generally evenly spaced from the light pipe 354. A plurality of light sources 172, such as multi-colored LED's, is carried by the circuit board 364 directly underneath a bottom edge 368 of the peripheral sidewall 358. The light sources 172 shine light into the peripheral sidewall 358 through the bottom edge 368 to create a light show that glows evenly through the light pipe 354 and the outer shell 352. A battery holder 370 for carrying one or more batteries 372 is carried by the circuit board 364 and disposed within an interior space of the hollow light pipe 354. Switches 186 are accessible from an underside of the base 356 to activate and control the light sources 172 to provide a light show as described herein before. In one embodiment, the inner surface 366 includes a surface treatment, such as a frosted surface, to provide relatively even dispersion of light through the outer shell.

Figure 18:
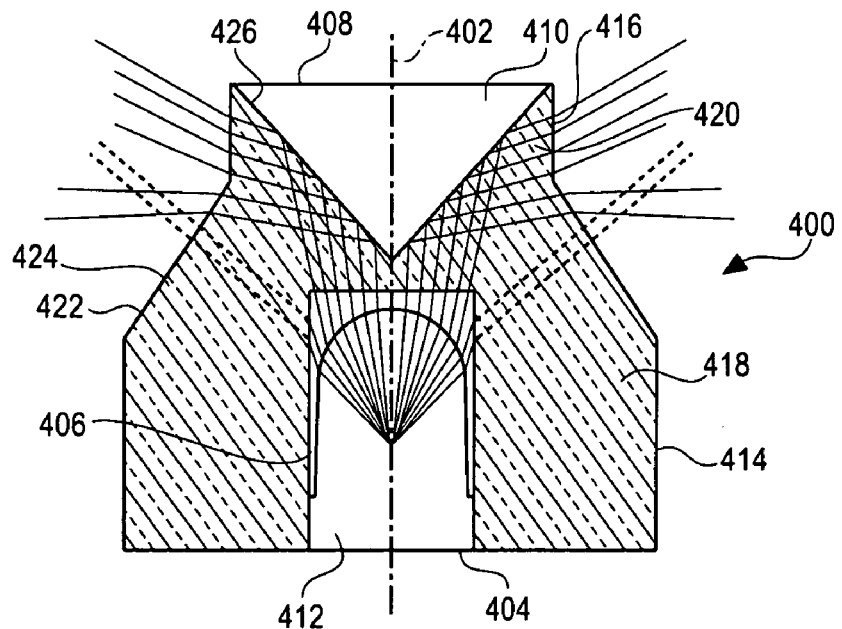
FIG. 18 is a cross-sectional view of a light pipe according to still another embodiment of the invention.

FIGS. 18-24 depict various other embodiments of light pipes that transmit light therethrough from a light receiving end to an opposite light dispersion end where a facet generally reflects a portion of the transmitted light laterally, or radially outwardly, as seen in FIG. 18 and may transmit a portion therethrough. These embodiments are suitable for use in various light apparatuses alone and/or in combination with other light pipes and/or light diffusers. The light pipes of FIGS. 18-24 are preferably made of a transparent or translucent material suitable for transmitting light from the light receiving end to the light dispersion end, such as glass and/or a polymeric resin. Although the cross-sections of such light pipes are depicted as being circular, other non-circular cross-sections are possible.

Referring to FIG. 18, a light pipe 400 extends along a straight longitudinal axis 402 between a light receiving end 404 having a cavity 406, such as a cylindrical bore, disposed therein and a light dispersing end 408 having a reflective facet 410 disposed therein. The cavity 406 is sized to receive a light source, such as an LED 412. The light pipe 400 has substantially smooth or polished first and second exterior surfaces 414, 416, defining first and second cylindrical portions 418, 420, wherein the first portion 418 has a diameter greater than a diameter of the second portion 420. The first cylindrical portion 418 also has a height that is greater than a height of the second cylindrical portion 410. A tapered exterior surface 422 defines a frustoconical portion 424 that connects the first and second exterior surfaces 414, 416 and the first and second cylindrical portions 418, 420. The reflective facet 410 includes a conical depression extending across and into the light dispersion end 408 through the second cylindrical portion 418 and into the frustoconical portion 424. The conical depression of the facet 410 forms a reflective surface 426 angularly displaced from the longitudinal axis 402 so as to disperse a portion of the transmitted light from the LED laterally, or radially outwardly, as seen in FIG. 18 and possibly transmit another portion of light therethrough.

Figure 19:
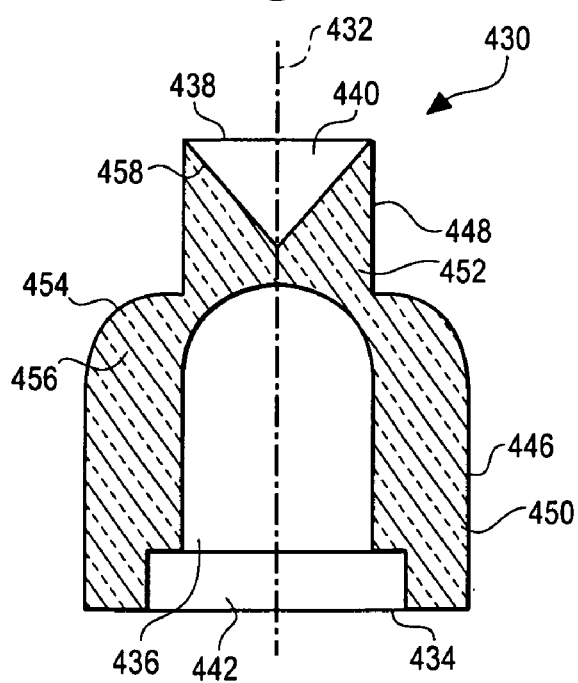
FIG. 19-21 are cross-sectional view of variations of a light pipe according to yet another embodiment of the invention.
Figure 20:
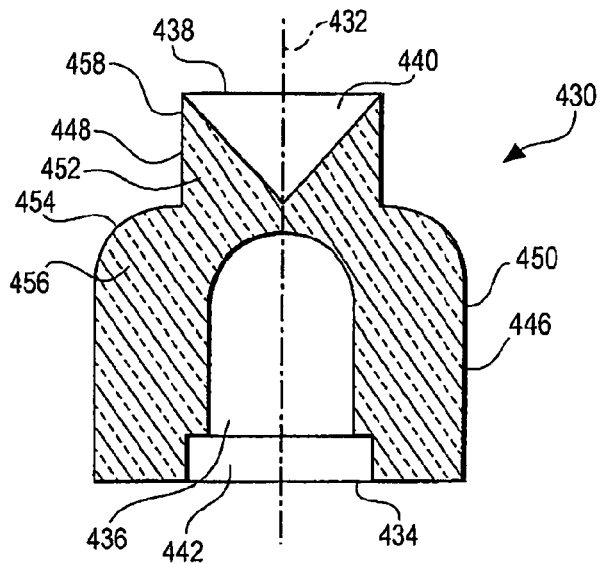
Figure 21:
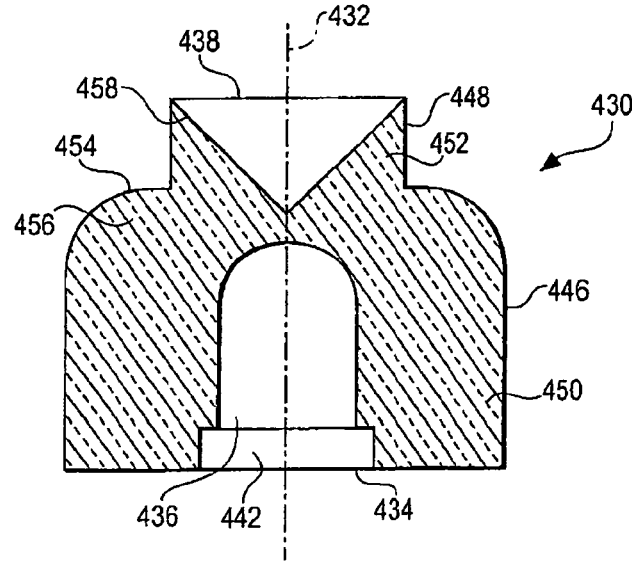

FIGS. 19-21 are three variations of another embodiment of a light pipe 430 that extends along a straight longitudinal axis 432 between a light receiving end 434 having a cavity 436, such as a cylindrical bore, disposed therein and a light dispersing end 438 having a reflective facet 440 disposed therein. The cavity 436 is sized to receive a light source, such as an LED 442. The light pipe 400 has substantially smooth or polished first and second exterior surfaces 446, 448 defining first and second cylindrical portions 450, 452, wherein the first portion 450 has a diameter greater than a diameter of the second portion 452. FIGS. 19-21 depict three variations of the same embodiment wherein the diameters of the first and second portions 450, 452 are varied to received different light dispersion results. Specifically, the first and second portions 450, 452 of FIG. 19 have the smallest diameters and the first and second portions 450, 452 of FIG. 21 have the largest diameters. Differences in diameter of the first and second portions 450, 452 alter a height along the longitudinal axis 432 and a diameter of the reflective facet 440 at the light dispersing end 438.

Still referring to FIGS. 19-21, a rounded exterior surface 454 defining a shoulder portion 456 connects the first and second exterior surfaces 446, 448 and the first and second cylindrical portions 450, 452. The reflective facet 440 includes a conical depression that forms a reflective surface 458 angularly displaced from the longitudinal axis 432 so as to disperse a portion of the light transmitted from the LED laterally, or radially outwardly, as depicted in FIG. 18 and possibly transmit another portion of light therethrough.

Figure 22:
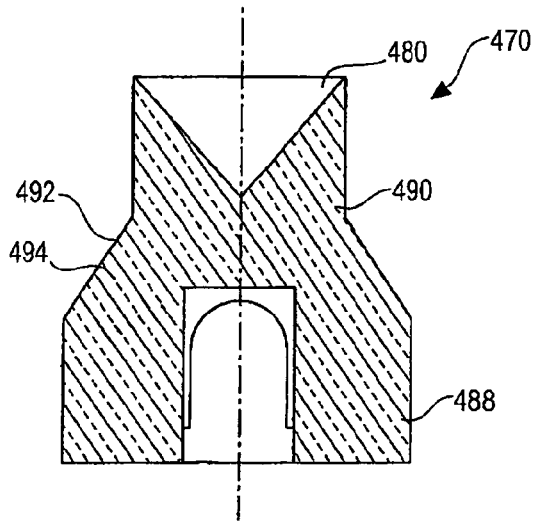
FIG. 22 is a cross-sectional view of a light pipe according to a further embodiment of the invention.

The light pipe 470 of FIG. 22 includes a reflective facet 480 having the same shape as the light pipe 400 of FIG. 18, except that the reflective facet 480 only extends through the second cylindrical portion 490 and does not extend into the third portion 494. Further, heights of the first and second cylindrical portions 488, 490 are similar, instead of one being greater than the other.

Figure 23:
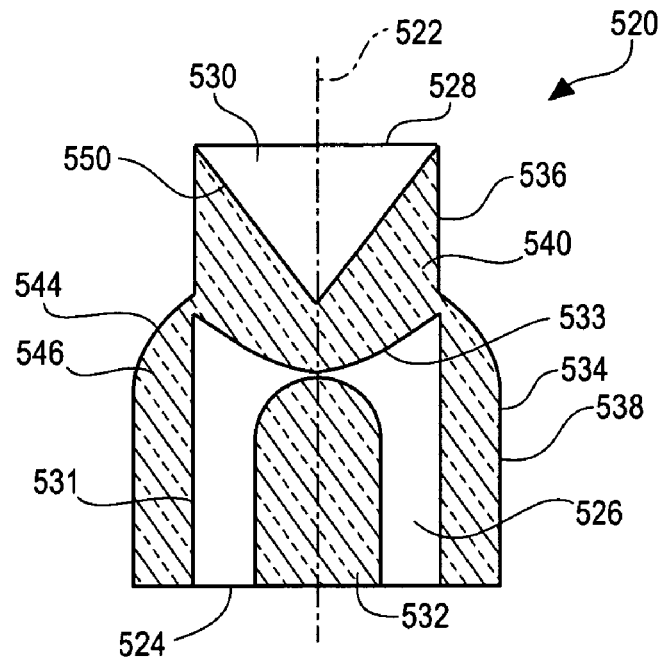
FIG. 23 is a cross-sectional view of a light pipe according to another embodiment of the invention.

Referring to FIG. 23, a light pipe 520 extends along a straight longitudinal axis 522 between a light receiving end 524 having a cavity 526, such as a cylindrical bore, disposed therein and a light dispersing end 528 having a reflective facet 530 similar to that discussed with respect to FIG. 18. The cavity 526 is sized to receive at least one light source, such as an LED 532, therein. The cavity 526 is defined by a cylindrical side wall 531 and a curved top wall 533 that extends into the cavity 526. The light pipe 520 has substantially smooth or polished first and second exterior surfaces 534, 536 defining first and second cylindrical portions 538, 540, wherein the first portion 538 has a diameter greater than a diameter of the second portion 540. A rounded exterior surface 544 defining a shoulder portion 546 connects the first and second exterior surfaces 534, 536 and the first and second cylindrical portions 538, 540.

As seen in FIG. 23, the reflective facet 530 only extends through the second portion 540 and does not extend into the shoulder portion 546. The reflective facet 530 further forms a reflective surface 550 angularly displaced from the longitudinal axis 522 to disperse a portion of the light transmitted from the LED laterally, or radially outwardly, as seen in FIG. 18 and possibly transmit another portion of light therethrough.

Figure 24:
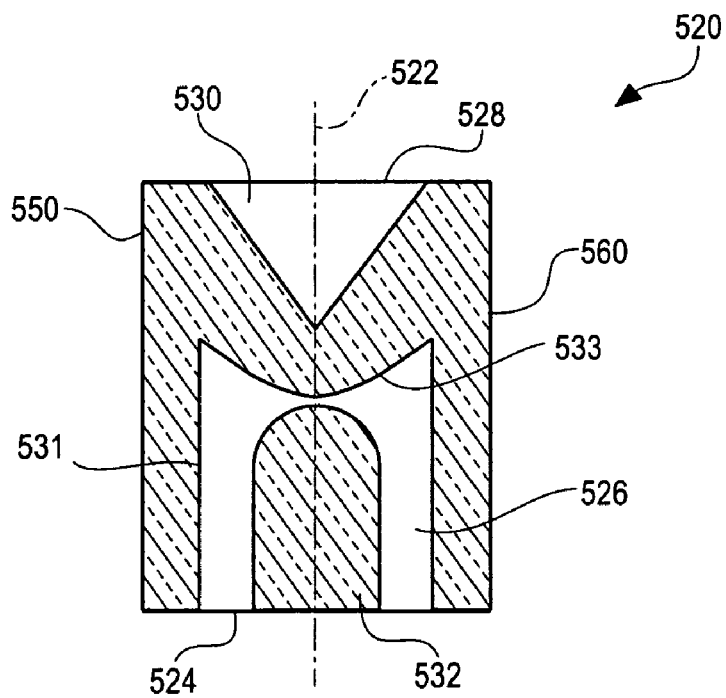
FIG. 24 is a cross-sectional view of a light pipe according to still another embodiment of the invention.

The embodiment of FIG. 24 is similar to that of FIG. 23. The light pipe 520 of FIG. 24 differs in that the light pipe 520 includes a single cylindrical exterior surface 560 having a single diameter throughout. The surface 560 defines all portions of the light pipe 520.

In the embodiments of FIGS. 18-24, the LED is connected to a PCB of a light apparatus in which it is disposed in order to power and control the LED. Although such embodiments are depicted as having a relatively small dimension along a longitudinal axis, this dimension may be increased or decreased as necessary to create the necessary light patterns.

Also, although the embodiments of FIGS. 18-24 are depicted as having a single light source, multiple light sources may be utilized, but the dispersion of the light transmitted from the LED will be different, for example, more light may be transmitted upwardly through the light pipe.

Although the light control devices as disclosed herein may be described as having smooth surfaces defining the respective light control devices, any surface treatments may be utilized, including coatings, roughened surfaces, textured surfaces, and the like.

INDUSTRIAL APPLICABILITY

The present disclosure may be used to bring light to darkness. Certain aspects of the present disclosure may also have pleasing and/or calming visual effects on a viewer. In addition, light pipes of the present disclosure may be used to disperse light from one or more small point light sources across a larger area of uniform light intensity and/or to a location displaced from the light source. Other uses and benefits of the present disclosure will be apparent to those skilled in the art.

All patents and publications to which specific reference is made in this application are incorporated by reference herein in the entirety thereof. Numerous modifications to the present disclosure will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications within the scope of the impending claims are reserved.

We claim:

1. A light apparatus comprising:
   a light pipe having a substantially smooth longitudinal exterior surface surrounding a substantially solid core comprising a light transmissive material extending between a first end and a second end;
   a light source disposed at the first end; and
   a facet comprising a depression in the second end, the facet defining a reflective surface that is angularly disposed from a longitudinal axis of the light pipe between approximately twenty degrees and approximately seventy degrees;
   wherein light emitted from the light source is transmitted through the light pipe from the light source and dispersed radially outwardly from the longitudinal axis by the facet and transmitted longitudinally through the facet.

2. The light apparatus of claim 1, further comprising a cavity defined in the first end and a peripheral base portion surrounding the cavity, wherein the light source is disposed within the cavity, and wherein the core is substantially straight.

3. The light apparatus of claim 1, wherein the reflecting surface is angularly disposed from the longitudinal axis at approximately forty five degrees.

4. The light apparatus of claim 1, wherein the facet comprises a frustoconical depression longitudinally displaced from a conical depression, the frustoconical depression surrounding an outer periphery of the conical depression, wherein at least one of the frustoconical depression and the conical depression forms a reflecting surface angularly disposed from the longitudinal axis at approximately forty-five degrees.

5. The light apparatus of claim 1, wherein the light pipe further comprises a first portion having a first width dimension and a second portion having a second width dimension, wherein the second width dimension is larger than the first width dimension, and wherein the exterior surface defines a transition section between the first portion and the second portion.

6. A light pipe comprising:
   a substantially solid light transmissive pipe having a longitudinal axis extending between a first end and a second end, the pipe having a substantially smooth longitudinal exterior surface;
   a cavity defined in the first end, the cavity adapted to receive at least one light source therein; and
   a recessed facet disposed at the second end, wherein the facet is angularly disposed from the longitudinal axis of the light pipe such that light transmitted from the cavity is reflected laterally outwardly from the pipe at the facet and is transmitted longitudinally through the second end;
   wherein the light transmissive pipe has a substantially solid core extending along the longitudinal axis completely between the recessed facet and the cavity.

7. The light pipe of claim 6, wherein the facet comprises a conical depression extending substantially across the second end, the conical depression defining a reflective surface angularly disposed from the longitudinal axis at approximately forty-five degrees.

8. The light pipe of claim 6, wherein the facet comprises a central conical depression and a peripheral frustoconical depression surrounding a periphery of the conical depression, the central conical depression longitudinally displaced beyond an end of the frustoconical depression, wherein at least one of the conical depression and the frustoconical depression defines a reflective surface angularly disposed from the longitudinal axis at approximately forty-five degrees.

9. The light pipe of claim 6, wherein the longitudinal axis is substantially straight.

10. The light pipe of claim 9, wherein the exterior surface is tapered from the first end to the second end.

11. The light pipe of claim 9, wherein the exterior surface is cylindrical.

12. The light pipe of claim 9, wherein the light transmissive pipe further comprises a first portion adjacent the first end having a first width dimension and a second portion adjacent the second end having a second width dimension, wherein the second width dimension is larger than the first width dimension, and wherein the exterior surface defines a transition section between the first portion and the second portion.

13. A lighting apparatus comprising:
   a light source comprising power circuitry; and
   a first light pipe comprising a light transmissive sidewall defining an interior space and a bottom end;
   wherein the bottom end is disposed immediately opposite the light source and the power circuitry is disposed at least partly in the interior space; and
   a second light pipe comprising a substantially solid light transmissive longitudinal section having a reflective facet disposed at a first end thereof; and
   a second light source disposed at a second end of the second light pipe opposite the first end thereof;
   wherein the second light source is disposed in the interior space and the reflective facet is disposed on an exterior side of the first light pipe.

14. The lighting apparatus of claim 13, wherein the first light pipe includes a top wall over the interior space extending from a top end of the sidewall and a curved transition between the sidewall and the top wall, wherein the curved transition has an inner radius larger than twice a thickness of an adjacent portion of the sidewall, and wherein the curved transition has an outer radius at least as large as a sum of the inner radius and the thickness of the sidewall.

15. The lighting apparatus of claim 13, wherein the first light pipe further includes a wall portion covering a top end opposite the bottom end and an opening in the wall portion, wherein the second light pipe extends through the opening.

16. The lighting apparatus of claim 13, wherein the first light source and the second light source comprise one or more light emitting diodes, and wherein the first light source comprises a first light effect and the second light source comprises a second light effect different than the first light effect.

17. The lighting apparatus of claim 16, wherein the first light effect comprises a multi-color light show and the second light effect comprises a flame flicker light effect.

18. The lighting apparatus of claim 16, wherein the power circuitry is adapted to switch between a plurality of different light effects and an off state.

19. The lighting apparatus of claim 13, wherein at least one recess is defined in the bottom end of the second light pipe, and the light source is disposed in the recess.

20. A lighting apparatus comprising:
- a light source comprising power circuitry; and
- a light pipe comprising a light transmissive sidewall defining an interior space and a bottom end;
- wherein the bottom end is disposed immediately opposite the light source and the power circuitry is disposed at least partly in the interior space, and
- wherein at least one recess is defined in the bottom end of the light pipe, and the light source is disposed in the recess; and
- a light diffuser disposed at least partly in the interior space and a second light source disposed in the interior space, wherein the diffuser comprises a translucent material having a bore extending partly therethrough and the second light source is disposed inside the bore, wherein the light pipe further comprises a top wall defining an opening therethrough, and wherein the light diffuser extends at least partly through the opening.

21. The lighting apparatus of claim 20, wherein the light diffuser further comprises a frustoconical portion surrounding the bore and a top portion disposed above the frustoconical portion, wherein the frustoconical portion is disposed in the interior space and the top portion is disposed in the opening.

22. The lighting apparatus of claim 20, wherein the light diffuser has a top dome portion and a bottom flange portion at opposite ends of the bore, wherein the bottom flange is disposed inside the interior space and the top dome extends through the opening.

23. The lighting apparatus of claim 20, further comprising a light barrier disposed in the opening between the light pipe and the light diffuser.

* * * * *